(12) United States Patent
Kamath et al.

(10) Patent No.: US 11,619,044 B2
(45) Date of Patent: Apr. 4, 2023

(54) PLASTERBOARDS AND METHODS FOR MAKING THEM

(71) Applicant: CertainTeed Gypsum, Inc., Malvern, PA (US)

(72) Inventors: Mithun N. Kamath, Northborough, MA (US); Choung-Houng Lai, Acton, MA (US); Michael J. Lemberger, Dudley, MA (US); Gerald Boydston, Cody, WY (US); Bryan Wiltzius, Largo, FL (US); Nathan Frailey, Cody, WY (US); Eric Dong, Northborough, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/231,576

(22) Filed: Dec. 23, 2018

(65) Prior Publication Data
US 2019/0203469 A1 Jul. 4, 2019

Related U.S. Application Data

(60) Provisional application No. 62/611,603, filed on Dec. 29, 2017.

(51) Int. Cl.
*E04C 2/04* (2006.01)
*B32B 13/08* (2006.01)
(Continued)

(52) U.S. Cl.
CPC .......... *E04C 2/043* (2013.01); *B28B 19/0015* (2013.01); *B28B 19/0092* (2013.01);
(Continued)

(58) Field of Classification Search
CPC . E04C 2/043; B28B 19/0015; B28B 19/0092; B32B 13/08; B32B 27/10;
(Continued)

(56) References Cited

U.S. PATENT DOCUMENTS

| | | | | |
|---|---|---|---|---|
| 4,020,237 A | * | 4/1977 | von Hazmburg | ....... E04C 2/043 428/535 |
| 5,188,263 A | * | 2/1993 | Woods | ................. B65D 83/752 222/394 |

(Continued)

OTHER PUBLICATIONS

Copending U.S. Appl. No. 16/231,577, filed Dec. 23, 2018.

*Primary Examiner* — Nathan L Van Sell
(74) *Attorney, Agent, or Firm* — McDonnell Boehnen Hulbert & Berghoff LLP (57) ABSTRACT

An example plasterboard includes a layer of hardened plaster having a first surface and an opposed second surface, a layer of polymer material having particles of one or more cementitiously-active substances mixed therein, and a liner between the first surface of the layer of hardened plaster and the layer of polymer material. Another example is a method of forming such a plasterboard. The method includes loading an extruder with the polymer material having the particles of one or more cementitiously active substances mixed therein, extruding the polymer material through a die to form the layer of polymer material on a surface of the liner, contacting with a layer of wet plaster material, the liner having the polymer material applied thereon such that the surface of the liner faces away from the wet plaster material, and drying the layer of wet plaster material to form the layer of hardened plaster.

19 Claims, 9 Drawing Sheets

(51) Int. Cl.
    *B32B 27/10*       (2006.01)
    *B28B 19/00*       (2006.01)

(52) U.S. Cl.
    CPC ............ *B32B 13/08* (2013.01); *B32B 27/10* (2013.01); *B32B 2262/101* (2013.01); *B32B 2315/18* (2013.01); *B32B 2607/00* (2013.01)

(58) Field of Classification Search
    CPC .......... B32B 2262/101; B32B 2315/18; B32B 2607/00; B32B 2264/104; B32B 2262/0253; B32B 2264/101; B32B 2262/0284; B32B 27/32; B32B 27/40; B32B 5/024; B32B 27/306; B32B 5/022; B32B 27/20; B32B 27/302; B32B 27/308; B32B 13/14; B32B 27/12; B32B 2264/10; B32B 2307/732; B32B 2307/538
    See application file for complete search history.

(56) References Cited

U.S. PATENT DOCUMENTS

| | | | | |
|---|---|---|---|---|
| 5,443,211 A * | 8/1995 | Young | ................... | B05B 7/1436 239/146 |
| 6,386,402 B1 * | 5/2002 | Woods | ................... | B44C 1/04 222/394 |
| 6,770,354 B2 * | 8/2004 | Randall | ................... | E04C 2/043 428/219 |
| 7,374,068 B2 * | 5/2008 | Greer, Jr. | ................... | B65D 83/306 222/1 |
| 2005/0202258 A1 * | 9/2005 | Swales | ................... | B32B 5/16 428/447 |
| 2005/0233657 A1 * | 10/2005 | Grove | ................... | D06N 7/00 442/43 |
| 2006/0144005 A1 * | 7/2006 | Tonyan | ................... | E04B 5/04 52/653.1 |
| 2009/0208714 A1 * | 8/2009 | Currier | ................... | E04D 11/02 428/212 |

* cited by examiner

PLASTERBOARDS AND METHODS FOR MAKING THEM

CROSS-REFERENCE TO RELATED APPLICATIONS

This application claims the benefit of priority of U.S. Provisional Patent Application No. 62/611603, filed Dec. 29, 2017, which is hereby incorporated herein by reference in its entirety.

BACKGROUND OF THE DISCLOSURE

1. Field of the Disclosure

The present disclosure relates generally to plasterboards and methods for making plasterboards. The present disclosure relates more particularly to plasterboards having a layer of polymer material having particles of one or more cementitiously-active substances mixed therein.

2. Technical Background

Plasterboards, also known as "drywall boards," are typically used to construct walls within, or on the exterior facades of, homes, businesses, or other buildings. Plasterboards are very often made of gypsum, but other materials, including lime and cement, are also used. A typical method for making a plasterboard involves dispensing and spreading a wet plaster material (e.g., a slurry of gypsum in water) onto a paper or fiberglass liner on a platform, and covering the plaster material with another paper or fiberglass liner. This sandwiched structure is fed through extruder plates to provide a structure of a desired thickness and allowed to cure to form a hardened plaster material disposed between the two liners of paper or fiberglass. The plasterboard may be cut into sections having predetermined lengths and widths that conform to accepted construction standards.

Improving thermal insulation in residential or commercial buildings is becoming an ever-increasing concern. Model building codes and design guidelines often specify a minimum thermal resistance value (e.g., R-value) for exterior facades of such buildings. While a number of construction techniques have been used to address this problem, one desirable technique involves bonding an insulation layer (e.g., foam) to an outward-facing surface of a plasterboard that has been attached to an exterior frame of a building. A decorative facade layer can then be applied to the outward-facing surface of the insulation layer. Such insulation layers are often bonded to the plasterboard with a cement-based adhesive. Sometimes, the cement-based adhesive will delaminate from the plasterboard and/or the insulation layer, causing undesirable air gaps between the insulation layer and the plasterboard, or causing the insulation layer to detach from the plasterboard entirely.

Accordingly, what are needed are improved processes for making plasterboards that exhibit improved bonding with cement-based adhesives, and plasterboards amenable for production by such processes with better product quality.

SUMMARY OF THE DISCLOSURE

One aspect of the disclosure is a plasterboard including a layer of hardened plaster material having a first surface and an opposed second surface;
a layer of polymer material having particles of one or more cementitiously-active substances mixed therein; and
a liner between the first surface of the layer of hardened plaster material and the layer of polymer material.

Another aspect of the disclosure is a method forming a plasterboard as described herein, the method including:
loading an extruder with the polymer material having the particles of one or more cementitiously-active substances mixed therein;
extruding the polymer material through a die to form the layer of polymer material on a surface of the liner;
contacting with a layer of wet plaster material, the liner having the polymer material applied thereon such that the surface of the liner faces away from the wet plaster material; and
drying the layer of wet plaster material to form the layer of hardened plaster material.

A method of installing a plasterboard as described herein, the method including:
securing the plasterboard to an exterior surface of a building such that the layer of polymer material faces away from the exterior surface of the building;
applying a cement-based adhesive onto the layer of polymer material; and
bonding, via the cement-based adhesive, a functional layer to the layer of polymer material, wherein the bonding occurs via a cementitious reaction between the particles of one or more cementitiously-active substances and the cement-based adhesive.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventors have noted disadvantages of currently available plasterboards that are designed for exterior installation (e.g., to be disposed on the exterior of the frame structure of a building). Such plasterboards generally include a layer of hardened plaster material between two liners (e.g., two sheets of water-resistant paper). After the plasterboard is attached to an exterior frame of a building, an insulation layer such as a foam-additive layer can be adhered to the outward-facing liner of the plasterboard. The present inventors have also noted that liners of existing plasterboards too often do not provide a suitable surface for bonding an insulation layer to an outward-facing liner of a plasterboard via application of cement-based adhesive. That is, delamination of the insulation layer from the plasterboard occurs too often.

The present inventors have determined that to address this problem, it is possible to provide cementitiously-active substances (e.g., minerals) on and/or within the outward-facing liner to improve the adhesion of the insulation layer to the outward-facing liner of the plasterboard.

Accordingly, one aspect of the disclosure is a plasterboard that includes a layer of hardened plaster material (e.g., a gypsum material) having a first surface and an opposed second surface, a layer of polymer material having particles of one or more cementitiously-active substances mixed therein, and a liner between the first surface of the layer of hardened plaster material and the layer of polymer material. The presence of the one or more cementitiously-active substances within the exposed layer of polymer material can enhance the ability of a cement-based adhesive to adhere an insulation layer to the plasterboard via cementitious reactions between the cement-based adhesive and the one or more cementitiously-active substances. Before hardening, some of the wet cement-based adhesive may diffuse into the layer of polymer material to react and bond with the one or more cementitiously-active substances within the layer of polymer material. The result may be a bond between the cement-based adhesive and the layer of polymer material that is not merely superficial, but penetrates somewhat into the layer of polymer material.

A wide variety of polymer materials can be used in the polymer layer. In certain embodiments, the polymer material takes the form of or includes a thermoplastic material such as ethylene methyl acrylate copolymer. The person of ordinary skill in the art will appreciate that a variety of other thermoplastics may be used, such as ethylene butyl acrylate copolymer, ethylene vinyl acetate copolymer, polyethylene, thermoplastic polyurethane, a styrene acrylic copolymer, an acrylic copolymer, or any combination thereof. In other embodiments, the polymer material of the polymer layer can be a cured coating material (e.g., disposed as a curable formulation and cured by heat and/or radiation). Additionally or alternatively, the polymer layer can include one or more polymers based on (meth)acrylamide, hydroxyl alkyl (meth)acrylate, (meth)acrylic acid, N-(alkoxymethyl)-acrylamide, N-(alkylol)-acrylamide, N-(alkyl)-acrylamide, diacetone (meth) acrylamide, acetoacetoxy alkyl(meth)acrylate or any combination thereof. In various particular embodiments, the thermoplastic layer can include N-(methoxymethyl)-acrylamide, N-(methylol)-acrylamide, N-(n-butoxymethyl)-acrylamide, or any combination thereof. The person of ordinary skill in the art will appreciate that other materials could be used to form the polymer layer.

In certain embodiments as otherwise described herein, the layer of polymer material may cover at least 50% of a surface of the liner that faces away from the first surface of the layer of hardened plaster material. In certain such embodiments, the layer of polymer material covers at least 75%, or even at least 90% of a surface of the liner that faces away from the first surface of the layer of the hardened plaster material. As the person of ordinary skill in the art will appreciate based on the present disclosure, an improvement in adhesion can be provided even if the polymer material does not completely cover the surface of the liner.

The layer of polymer material can be provided in a variety of thicknesses. The person of ordinary skill in the art will select a thickness for the layer of polymer material based on, for example, the desired manufacturing technique and/or the desired depth of roughness enhancing features on the polymer layer. For example, in certain embodiments as otherwise described herein, the layer of polymer material has a thickness within a range of 10 µm to 500 µm, for example, in a range of 25-250 µm, or 25-100 µm, or 50-500 µm, or 50-250 µm, or 50-100 µm, or 40-60 µm.

The layer of polymer material can have a surface (e.g., facing away from the layer of hardened plaster material) having a roughness of at least 5 µm (e.g., within a range of 5-500 µm, 5-100 µm, 5-50 µm, 5-35 µm, or 20-30 µm.

A mass ratio of the particles of one or more cementitiously-active substances to the polymer material may be at least 1%, (e.g., may be within a range of 5% to 30%, may be within a range of 10% to 25%, may be within a range of 15% to 20%), or may be less than or equal to 70%.

The polymer layer desirably has a relatively high amount of polymer. In certain embodiments, the polymer layer includes at least 20%, at least 50%, or even at least 70% by weight of one or more polymers. For example, in certain embodiments, the polymer layer includes one or more polymers in an amount in the range of 20-99%, or 20-95%, or 20-90%, or 20-80%, or 20-70%, or 20-40%, or 50-99%, or 50-95%, or 50-90%, or 50-80%, or 50-70%, or 70-99%, or 70-95%, or 70-90%.

A variety of cementitiously active substances can be used in the polymer layer. For example, in certain embodiments, the cementitiously-active substance is an inorganic cementitiously-active substance. The one or more cementitiously-active substances may include, for example, one or more of diatomaceous earth, calcined clay, air floated clay, wollastonite, or granulated blast-furnace slag. In other embodiments, a cement (e.g., containing a calcium aluminate cement or a calcium sulfoaluminate cement) can be used as a cementitiously-active substance. In other embodiments, one or more polar molecules (e.g., molecules having a net electric dipole or multipole moment) can be used as a cementitiously-active substance.

The cementitiously-active substance can be provided in the polymer layer in a variety of amounts. The person of ordinary skill in the art will, based on the disclosure herein, provide the cementitiously-active substance in an amount to provide a desired degree of adhesion with a cement-based adhesive. In certain embodiments, the one or more cementitiously-active substances are present in the polymer layer in an amount up to 60%, for example, in an amount up to 30% or an amount up to 25%. In certain embodiments, the one or more cementitiously-active substances are present in the polymer layer in an amount in the range of 1-60%, or 1-30%, or 1-25%, or 1-20%, or 1-15%, or 5-60%, or 5-30%, or 5-25%, or 5-20%, or 5-15%, or 10-60%, or 10-30%, or 10-25%, or 10-20%, or 20-60%, or 20-30%.

The polymer layer can include a variety of other materials. For example, in certain embodiments, the polymer material includes calcium carbonate, aragonite, mica, glass fibers, glass beads, or any combination thereof. But other conventional fillers and additives can also be present.

The person of ordinary skill in the art will appreciate that a variety of liner materials may be used in the liner. The person of ordinary skill in the art can select a conventional liner material based on, for example, a desired manufacturing process. For example, in certain embodiments as otherwise described herein, the liner includes (or is) a sheet of paper, such as kraft paper. In other embodiments, the liner includes (or is) a fiberglass mat. In other embodiments, the liner includes (or is) a felt mat. Additionally or alternatively, the liner can include polypropylene, polyethylene, polyethylene terephthalate, or any combination thereof in a woven or non-woven form.

In some embodiments, a functional layer (e.g., a foam-based material, wood, or mineral wool) is bonded, via a cement-based adhesive, to a surface of the layer of polymer material that faces away from the liner. The cement-based adhesive may include or take the form of one or more of belite, alite, tricalcium aluminate, or brownmillerite. The functional layer may be bonded to the layer of polymer material via a cementitious reaction between the particles of one or more cementitiously-active substances and the cement-based adhesive. In some cases, the plasterboard forms part of an exterior facade of a building.

Certain embodiments may include one or more raised features on a surface of the layer of polymer material that faces away from the liner. The features can be provided in a variety of arrangements or patterns, both regular and irregular. In various examples, the one or more raised features have one or more of a cross-hatched pattern or a honeycomb pattern. In some examples, the one or more raised features include a plurality of raised ridges that are parallel to each other. But the person of ordinary skill in the art will appreciate that these are only examples, and that myriad other arrangements are possible.

Desirably, the features occupy a substantial surface area of the polymer layer. For example, in certain embodiments as otherwise described herein, the features occupy a fraction of the surface area of the polymer layer in the range of 10-90%. In certain such embodiments, the features occupy a fraction of the surface area of the polymer layer in the range of 20-80%, or 30-70%.

Similarly, the features desirably occupy a substantial surface area of the overall plasterboard. For example, in certain embodiments as otherwise described herein, the features occupy a fraction of the surface area of an exterior-facing surface of the plasterboard in the range of 10-90%. In certain such embodiments, the features occupy a fraction of the surface area of an exterior-facing surface of the plasterboard in the range of 20-80%, or 30-70%.

The features can be provided with a variety of spacings. For example, in certain embodiments, the features can be provided with an average spacing between features (e.g., a "pitch" for regularly-spaced features) in the range of 0.1 mm to 5 mm. In various such embodiments, the features have an average spacing between features in the range of 0.1 mm to 3 mm, or 0.1 mm to 2 mm, or 0.1 mm to 1 mm, or 0.5 mm to 5 mm, or 0.5 mm to 3 mm, or 0.5 mm to 2 mm, or 1 mm to 5 mm, or 1 mm to 3 mm. The person of ordinary skill in the art can, based on the disclosure herein, provide a spacing in conjunction with the feature type and depth to provide a desired degree of adhesion of a cement-based adhesive.

The one or more raised features can have a variety of depths. The person of ordinary skill in the art will select feature depths to provide a desired degree of texture to the polymer layer surface, for example to provide a desired degree of adhesion, in view of the manufacturing technique used to provide the surface relief. In certain embodiments as otherwise described herein, the one or more raised features include one or more features having a depth greater than 5 µm or in the range of 5-150 µm. For example, in various embodiments, the one or more raised features include one or more features having a depth within a range of 75 µm to 95 µm, within a range of 50 µm to 115 µm, or within a range of 35 µm to 130 µm. In some examples, the depth of the one or more features can approach the total thickness of the layer of polymer material.

In certain particular embodiments, the one or more raised features include a first plurality of raised ridges that are substantially parallel to each other and a second plurality of raised ridges that are substantially parallel to each other. In this context, the raised ridges of the first plurality might not be parallel with the raised ridges of the second plurality. More specifically, the one or more raised features may, for example, include a first section that includes the first plurality of raised ridges and a second section that includes the second plurality of raised ridges. In this context, the first section may in certain embodiments be adjacent to the second section.

In various embodiments, the first surface of the layer of hardened plaster material and/or the liner have shapes (e.g., profiles) that substantially conform to the one or more raised features of the layer of polymer material. However, in other embodiments, the surfaces of the liner and/or the layer of hardened plaster material do not substantially conform to the surface texture of the layer of polymer material. For example, in many embodiments, the surfaces of the liner and/or the layer of hardened plaster material remain substantially flat. As the person of ordinary skill in the art will appreciate, the degree to which the surface texture of the layer of polymer material is found in the liner and/or the layer of hardened plaster material will depend on the thicknesses of the layer of polymer material and the liner, the sizes of the features, and the particular manufacturing technique used to apply the layer of polymer material to the liner.

Another aspect of the disclosure is a method for forming the aforementioned plasterboards. The method includes loading an extruder (e.g., a single screw extruder) with the polymer material having the particles of one or more cementitiously-active substances mixed therein and extruding (e.g., via a high-speed process) the polymer material through a die (e.g., a film die) to form the layer of polymer material on a surface of the liner. The method further includes contacting with a layer of wet plaster material, the liner having the polymer material applied thereon such that the surface of the liner faces away from the wet plaster material, and drying the layer of wet plaster material to form the layer of hardened plaster material.

Extruding the polymer material may include extruding the polymer material while heating the polymer material to a temperature within a range of 150° C. to 300° C.

The method may also involve deploying the liner over a chill roll (e.g., a water cooled chill roll) while extruding the polymer material onto the surface of the liner (e.g., to cool the polymer material while the polymer material is in contact with the surface of the liner). Deploying the liner over the chill roll may include deploying the liner such that the surface of the liner faces the chill roll, or alternatively, such that the surface of the liner faces away from the chill roll.

Yet another aspect of the disclosure is a method of installing any of the aforementioned plasterboards. The method includes securing the plasterboard to an exterior surface of a building such that the layer of polymer material faces away from the exterior surface of the building, applying a cement-based adhesive onto the layer of polymer material, and bonding, via the cement-based adhesive, a functional layer (e.g., a layer of foam-based material) to the layer of polymer material. The bonding may occur via a cementitious reaction between the particles of one or more cementitiously-active substances and the cement-based adhesive.

One embodiment of such a plasterboard is described with respect to FIGS. 1-4 below. FIGS. 1-4 each show a different view of a plasterboard 100. As shown in the side views of FIGS. 1 and 2, the plasterboard 100 has a layer of hardened plaster material 102 having a first surface 104 and an opposed second surface 106, a layer of polymer material 108 having particles 110 of one or more cementitiously-active substances mixed therein, and a liner 112 between the first surface 104 of the layer of hardened plaster material 102 and the layer of polymer material 108. More specifically, the liner 112 is in contact with the layer of hardened plaster material 102 and in contact with the layer of polymer material 108. The liner 112 includes a surface 116 that will be discussed below. The plasterboard 100 also includes a liner 114 disposed on the second surface 106 of the layer of hardened plaster material 102. The liners 112 and 114 may respectively take the form of or include a sheet of paper, a fiberglass mat, and/or a felt mat. The layer of polymer material 108 also includes a surface 118 that is discussed below.

As the person of ordinary skill in the art will appreciate, the hardened plaster material described herein may be made using a variety of different inorganic base materials. For example, in certain embodiments of the plasterboards and methods as otherwise described herein, the hardened plaster material comprises a base material that is a gypsum material. In other embodiments of the plasterboards and methods as otherwise described herein, the plaster material comprises a base material that is, for example, lime or cement.

The plasterboards of the present disclosure may be made in a variety of thicknesses. The person of ordinary skill in the art will select a desirable thickness for a particular end use. In certain embodiments of the plasterboards and methods as otherwise described herein, the total thickness of the plasterboard (i.e., between the surface 119 of the liner 114 and the surface 118 of the layer of polymer material 108 of FIGS. 1 and 2) is at least 0.25 inches and no more than 2 inches, e.g., in the range of 0.30 inches to 1.25 inch or in the range of 0.5 inch to 1 inch. In certain embodiments, the total thickness of the plasterboard is substantially equal to 0.375 inches. In other particular embodiments, the total thickness of the plasterboard is substantially equal to 0.5 inches. In still other particular embodiments, the total thickness of the plasterboard is substantially equal to 0.625 inches. And in still other particular embodiments, the total thickness of the plasterboard is substantially equal to one inch (e.g., especially when lower density plaster materials are used). The surface 118 may be processed to have a roughness of at least 5 µm (e.g., within a range of 5-500 µm, 5-100 µm, 5-50 µm, 5-35 µm, or 20-30 µm as discussed below).

The person of ordinary skill in the art will appreciate, however, that the presently disclosed methods and boards can be of a variety of thicknesses and weights. For example, the board can be a lightweight board ⅝" in thickness with a weight on the order of 1,400 lb/MSF (MSF=1,000 square feet), or can be a lightweight board 1" in thickness with a weight on the order of 2,240 lb/MSF. Generally, boards can be made in any desirable weight, for example, from lightweight (1,200 lb/MSF) to normal weight (2,000 lb/MSF) to heavy weight (3,000 lb/MSF), in any desirable thickness (e.g., ½", ⅝" or 1" thick). And as the person of ordinary skill in the art will appreciate, additional thin layers of plaster material (e.g., gypsum, usually of higher density than the bulk material) can be applied to the outsides of the paper or fiberglass layers cladding the plaster material core, in order to help improve mechanical strength.

As the person of ordinary skill in the art will appreciate, the plasterboard 100 can be formed with any of the features described generally herein, e.g., the thicknesses as described above, and the materials as described above.

Figure 1:
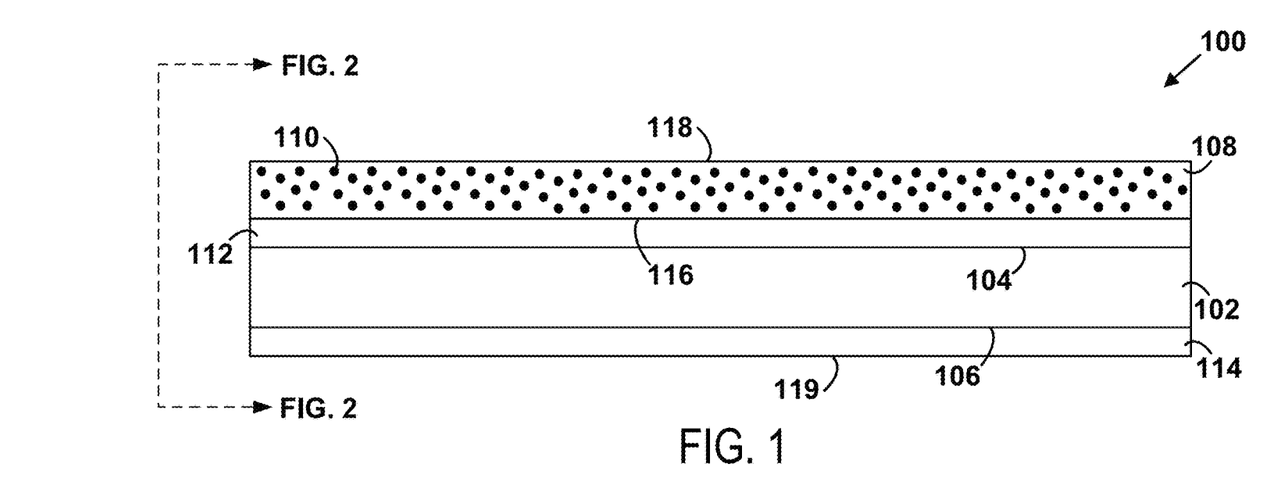
FIG. 1 is a schematic side view of a plasterboard according to one embodiment of the disclosure.
Figure 2:
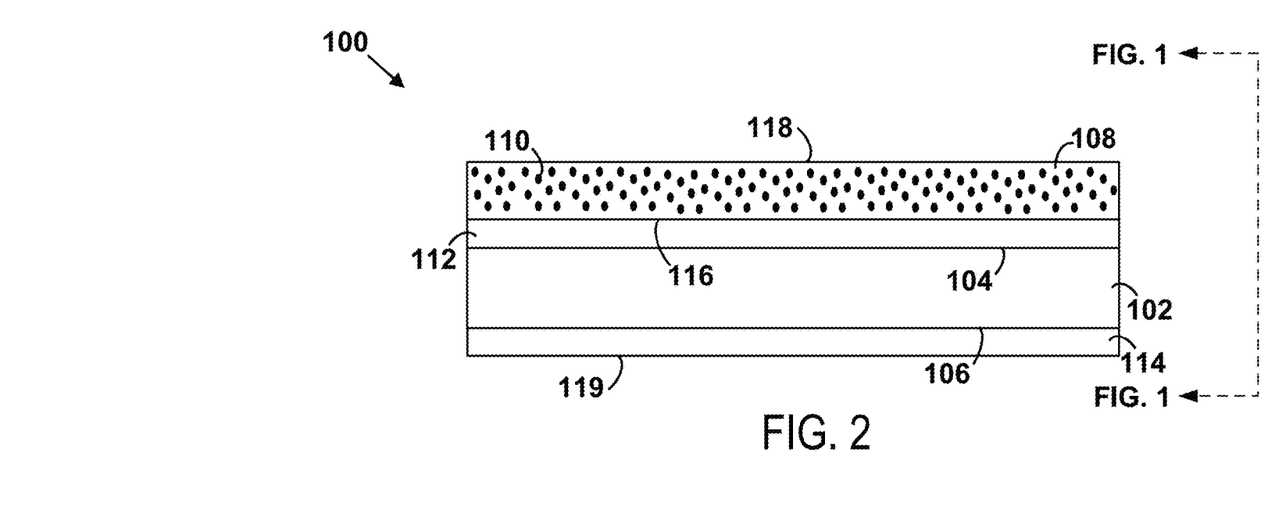
FIG. 2 is a schematic side view of a plasterboard according to another embodiment of the disclosure.
Figure 3:
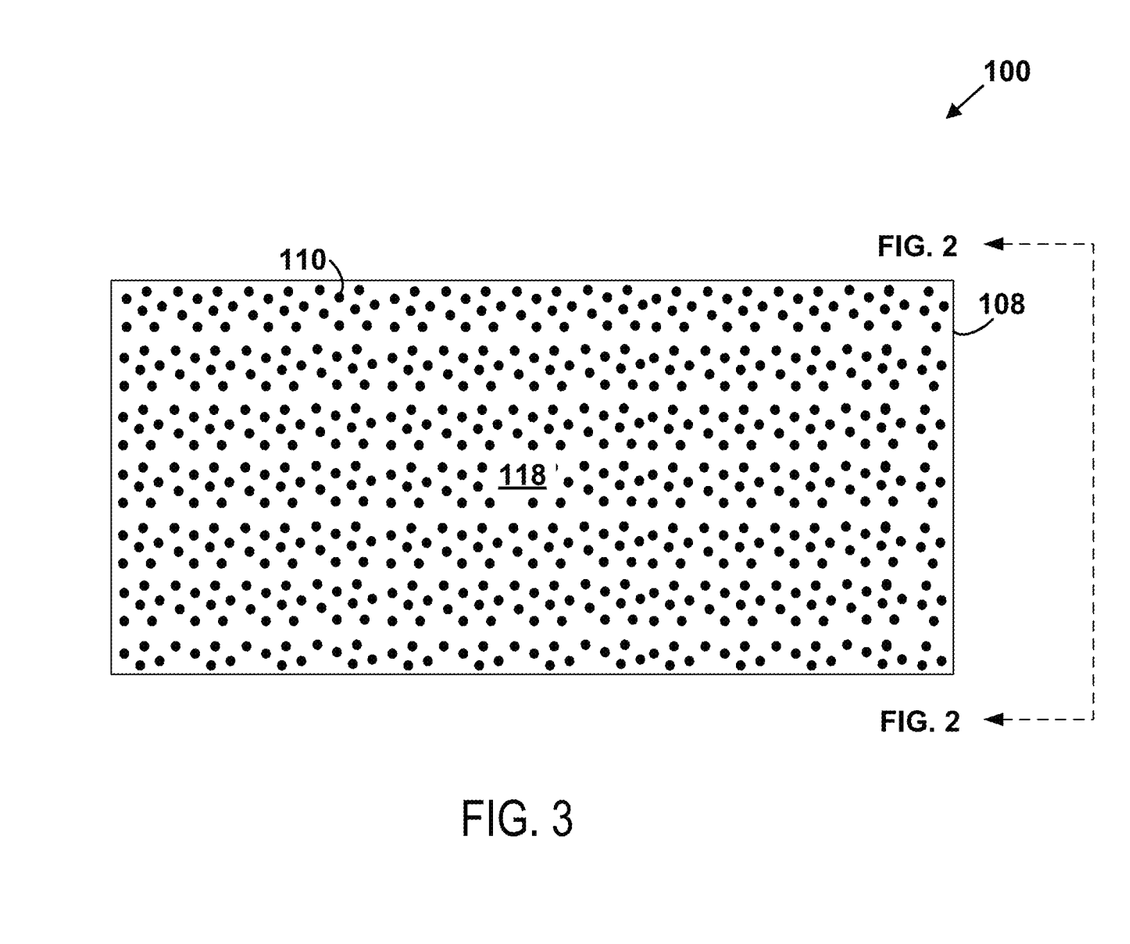
FIG. 3 is a schematic top view of a plasterboard according to another embodiment of the disclosure.

The layer of polymer material 108 has a thickness between the surface 116 and the surface 118 of 10 µm to 500 µm, for example, in a range of 25-250 µm, or 25-100 µm, or 40-500 µm, or 40-250 µm, 40-100 µm, or 40-60 µm. As shown in FIGS. 1-3, the layer of polymer material 108 covers approximately 100% of the surface 116 of the liner 112 that faces away from the first surface 104 of the layer of hardened plaster material 102. In other examples, the layer of polymer material covers at least 50%, at least 75%, or at least 90% of the surface 116 of the liner 112. The polymer material 108 may include or take the form of a thermoplastic material, such as ethyl methyl acrylic copolymer.

The particles 110 of one or more cementitiously-active substances may include particles of polar molecules, i.e., molecules that have a net electric dipole or multipole moment. Additionally or alternatively, the particles 110 of one or more cementitiously-active substances may include and/or be composed of one or more of diatomaceous earth, calcined clay, air floated clay, or granulated blast-furnace slag. A mass ratio of the particles 110 of one or more cementitiously-active substances to the polymer material 108 may be at least 1%, may be within a range of 5% to 30%, may be within a range of 10% to 25%, may be within a range of 15% to 20%, or may be less than or equal to 70%.

FIG. 3 is a top view of the plasterboard 100 showing the layer of polymer material 108 and the particles 110 of one or more cementitiously-active substances mixed therein.

Figure 4:
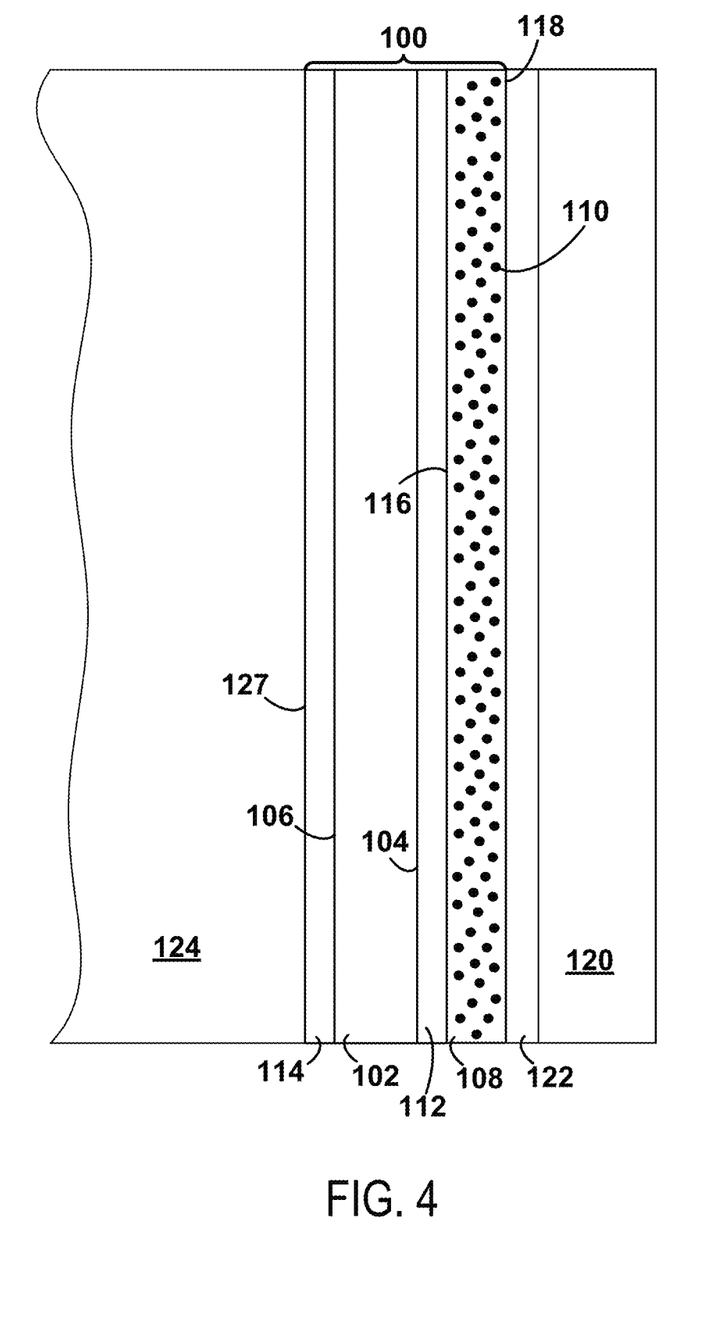
FIG. 4 is a schematic side view of a plasterboard attached to an exterior frame of a building according to another embodiment of the disclosure.

FIG. 4 is a side view of the plasterboard 100 attached (e.g., via nails, screws, other fasteners, or an adhesive) to an exterior frame 124 of a building. More specifically, the liner 114 is in contact with (e.g., adhered to) the exterior frame 124. A functional layer 120 is bonded, via a cement-based adhesive 122, to the surface 118 of the layer of polymer material 108 that faces away from the liner 112. The functional layer 120 is bonded to the layer of polymer material 108 via a cementitious reaction between the particles 110 of one or more cementitiously-active substances and the cement-based adhesive 122. The cement-based adhesive 122 includes one or more of belite, alite, tricalcium aluminate, or brownmillerite. The functional layer 120 may take the form of or include a layer of foam-based material (e.g., foam insulation).

Figure 5:
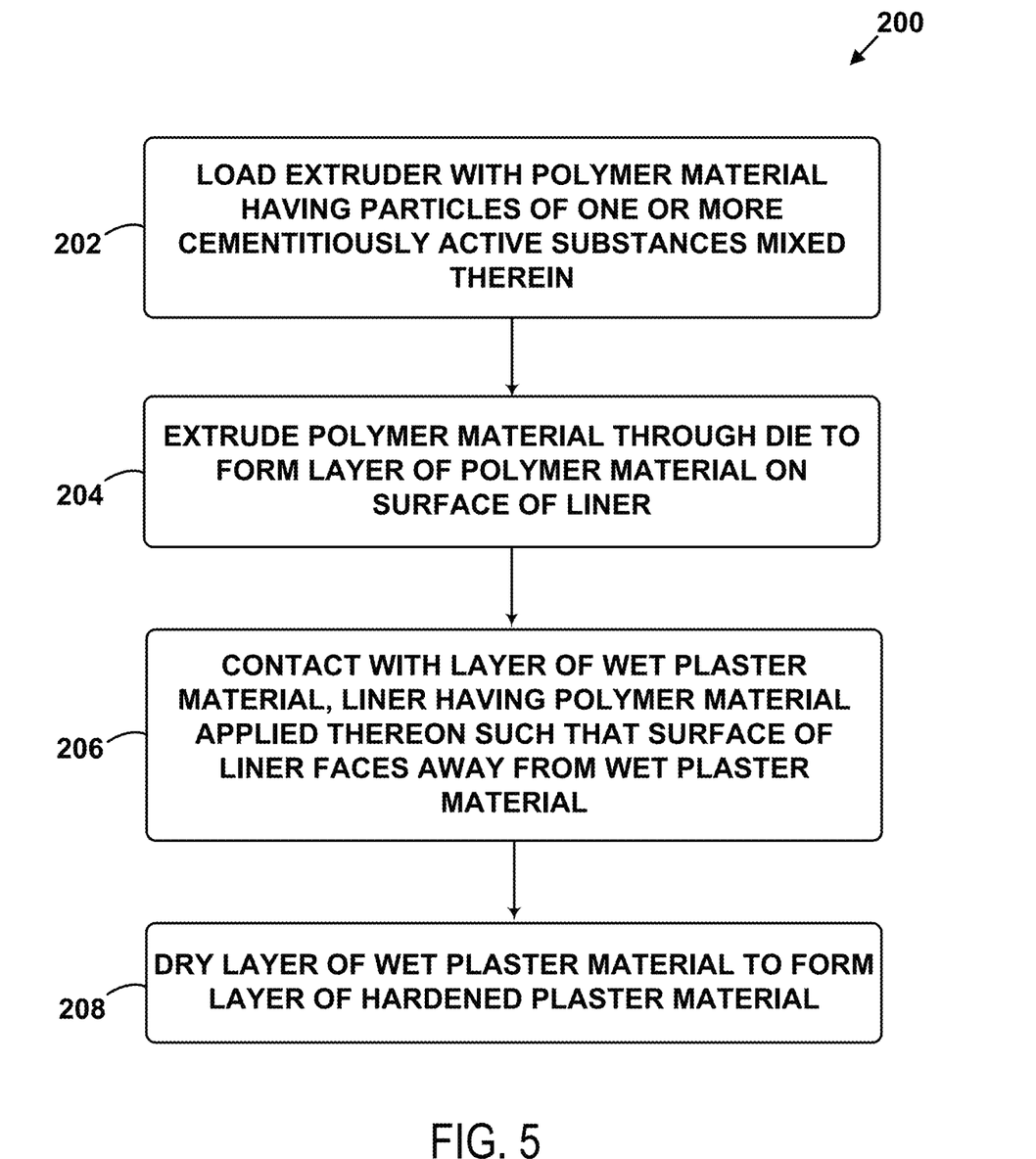
FIG. 5 is a block diagram of a method for forming a plasterboard according to another embodiment of the disclosure.

FIG. 5 is a block diagram of a method 200 of forming a plasterboard. The method 200 may be used to form the plasterboard 100, for example.

Figure 6:
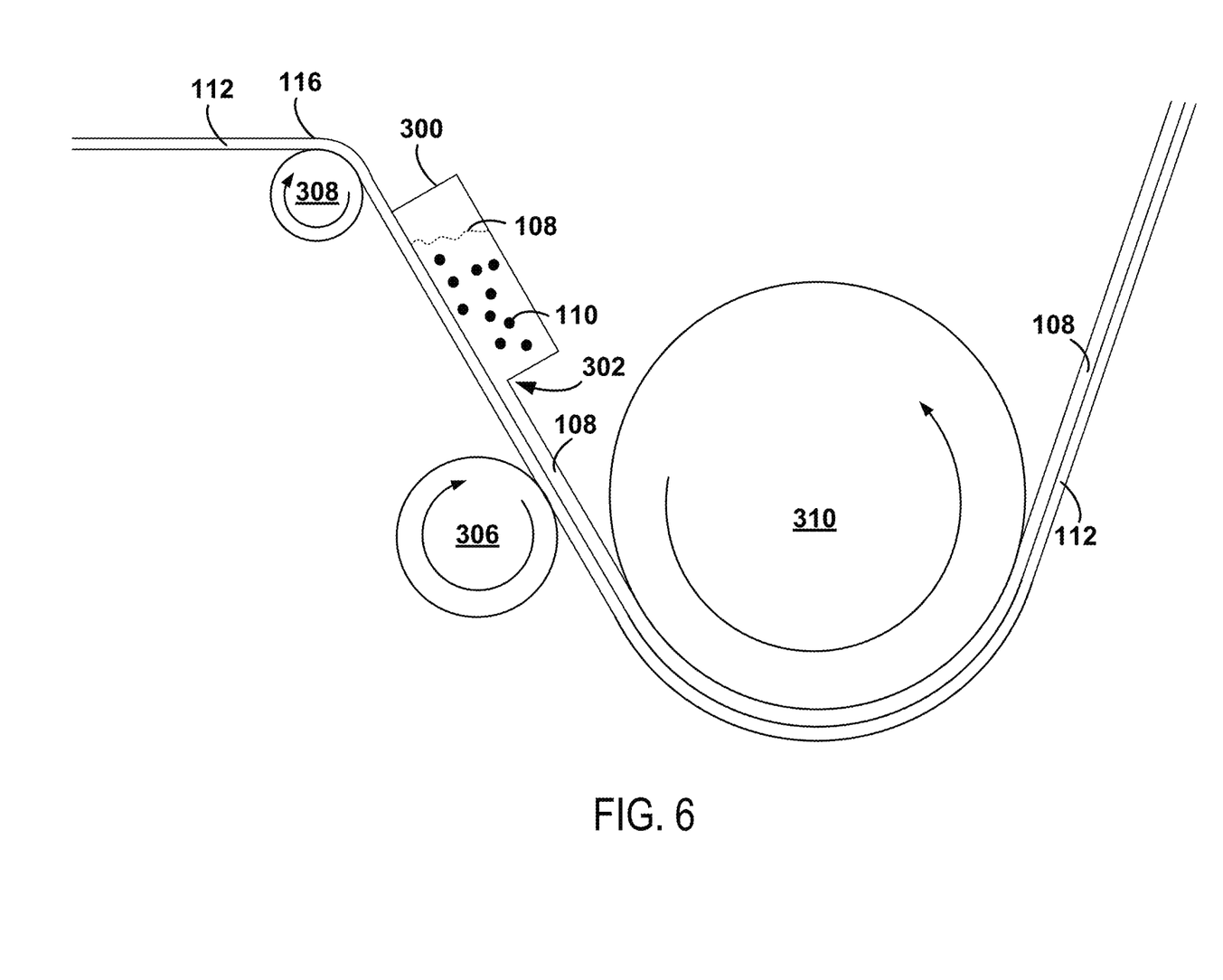
FIG. 6 is a schematic depiction of forming a plasterboard according to another embodiment of the disclosure.

At block 202, the method 200 includes loading an extruder (e.g., a single screw extruder) with the polymer material having the particles of one or more cementitiously-active substances mixed therein. As shown in FIG. 6, an extruder 300 is loaded with the polymer material 108 having the particles 110 of one or more cementitiously-active substances mixed therein. The extruder 300 is positioned to dispense the (heated) polymer material 108 having the particles 110 of one or more cementitiously-active substances mixed therein onto the surface 116 of the liner 112.

At block 204, the method 200 includes extruding the polymer material through a die (e.g., a film die) to form the layer of polymer material on a surface of the liner. As shown in FIG. 6, the polymer material 108 may be extruded (e.g., pushed) through a die 302 of the extruder 300 to form the (e.g. sheet-like) layer of polymer material 108 on the surface 116 of the liner 112. In some examples, extruding the polymer material 108 includes extruding the polymer material 108 while heating the polymer material 108 to a temperature within a range of 100° C. to 300° C. (e.g., within a range of 100-270° C., 150-270° C., 200-270° C., or approximately 260° C. In some examples, a high speed extrusion process may be used. For instance, the polymer material can be extruded at a rate within a range of 50-400 feet per minute (ft/min) (e.g., within a range of 100-400, 200-400, or 300-400 ft/min). As shown in FIG. 6, the liner 112 is deployed over a roller 308 and a roller 306 to facilitate forming the layer of polymer material 108 with a somewhat uniform thickness over the surface 116 of the liner 112.

As shown in FIG. 6, the method 200 may further involve deploying the liner 112 over a chill roll 310 (e.g., a water-cooled chill roll) while extruding the polymer material 108 onto the surface 116 of the liner 112. The chill roll 310 may take the form of a barrel-like roller with a circulated water cooling system. For example, the chill roll 310 may be used to cool the polymer material 108 while the polymer material 108 is in contact with the surface 116 of the liner 112 (e.g., to solidify the layer of polymer material 108 upon the surface 116). As such, the method 200 may involve deploying the liner 112 such that the surface 116 of the liner 112 faces the chill roll 310. In other embodiments, the surface 116 of the liner faces away from the chill roll 310.

Figure 7:
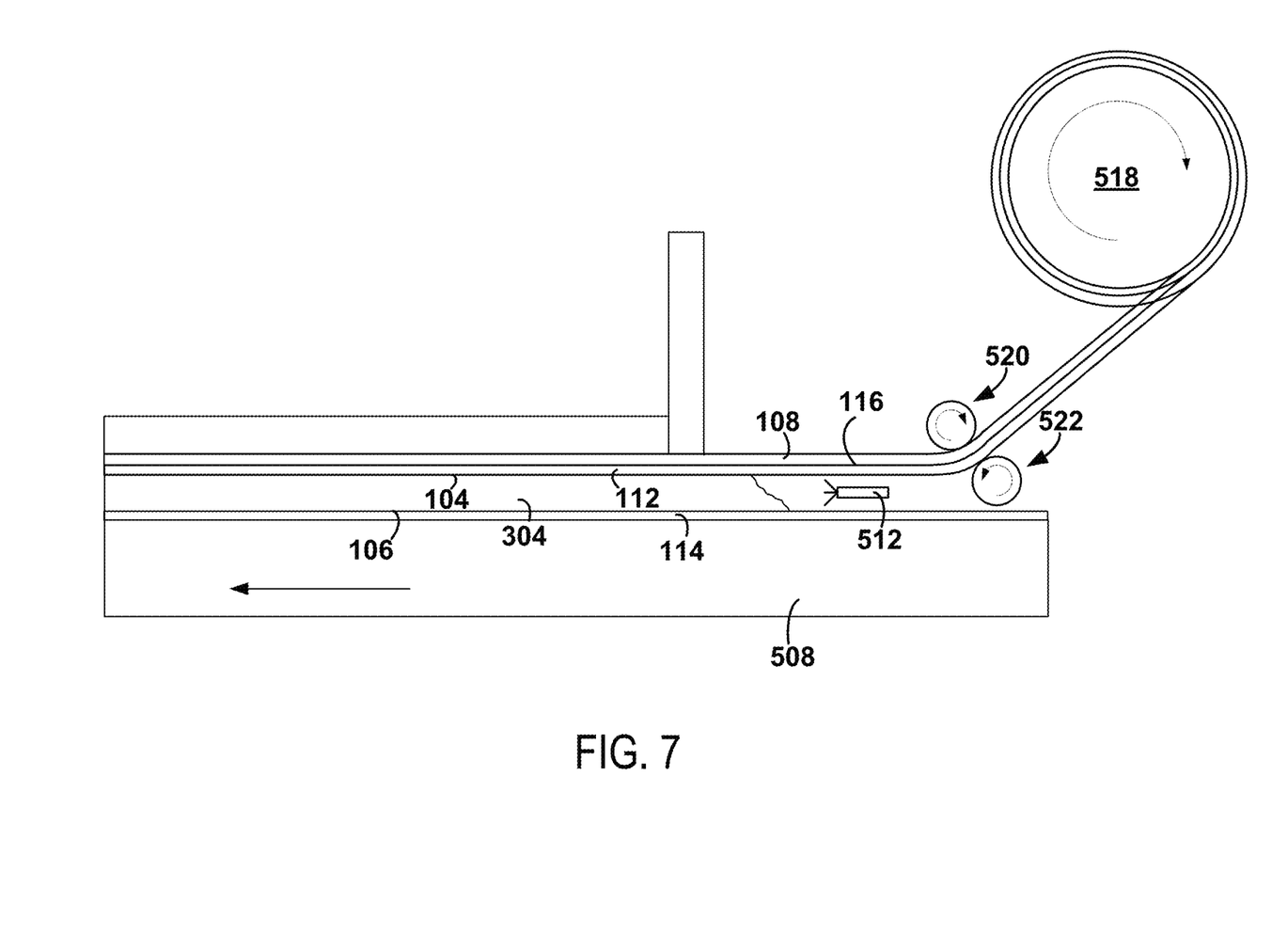
FIG. 7 is a schematic depiction of forming a plasterboard according to another embodiment of the disclosure.

At block 206, the method 200 includes contacting with a layer of wet plaster material, the liner having the polymer material applied thereon such that the surface of the liner faces away from the wet plaster material. As shown in FIG. 7, this may involve contacting with a layer of wet plaster material 304, the liner 112 having the (e.g., solidified) polymer material 108 applied thereon such that the surface 116 of the liner faces away from the wet plaster material 304.

For example, the layer of wet plaster material 304 is provided (e.g., dispensed by dispenser 512) on a platform or conveyor 508. The layer of wet plaster material 304 is a wet, formable plaster material that can harden into the layer of hardened plaster material 102 shown in FIGS. 1, 2, and 4. The layer of wet plaster material 304 can be, for example, a gypsum slurry or another type of slurry. In other embodiments, the layer of wet plaster material is a wet lime material or a wet cement material. But the person of ordinary skill in the art will appreciate that a variety of wet plaster materials can be used in the practice of the processes as described herein. The layer of wet plaster material can include any additives or fillers familiar to the person of ordinary skill in the art, including those described above with respect to the layer of hardened plaster material. The layer of wet plaster material is desirably a semiliquid or otherwise formable mixture that can be, for example, dispensed and spread onto a surface such as a platform or conveyor.

Some examples involve dispensing (e.g., via the dispenser 512) the layer of wet plaster material 304 onto a platform 508. The platform 508 may be a stationary platform like a table in some examples. In other examples, the platform 508 may take the form of a moving conveyor and dispensing the layer of wet plaster material 304 may involve dispensing the layer of wet plaster material 304 onto the conveyor as the conveyor moves from right to left (e.g., with reference to FIG. 7). As the person of ordinary skill in the art will appreciate, a length of paper, fiberglass mat or fabric, or other backing material may be disposed on the platform, such that the wet plaster material is dispensed on and spread onto the backing material (e.g., liner). In such embodiments, the paper, fiberglass, or other backing material will remain at the surface of the plasterboard, as is conventional for wallboard materials.

For example, in the embodiment of FIG. 7, the liner 114 is disposed on the platform 508 (here, a conveyor travelling from right to left as indicated by the arrow.) The layer of wet plaster material 304 is dispensed on the liner 114 (i.e., on the platform 508) via the dispenser 512. The process can be run continuously, like conventional gypsum wallboard manufacturing processes.

The liner 112 with the layer of polymer material 108 disposed thereon can be disposed on top of the layer of wet plaster material 304, as shown in FIG. 7. For example, after the formation of the layer of polymer material 108 on the liner 112 as shown in FIG. 6, the liner 112 may be rolled up on a spool 518. Next, the liner 112 may be unfurled and fed between a roller 520 and a roller 522 such that the liner is placed onto the layer of wet plaster material 304 as the platform 508 moves the layer of wet plaster material 304 from right to left as shown in FIG. 7.

At block 208, the method includes drying the layer of wet plaster material to form the layer of hardened plaster material. For example, the layer of wet plaster material 304 may be dried to form the layer of hardened plaster material 102 shown in FIGS. 1, 2, and 4. The layer of wet plaster material can be heated (e.g., via an oven or a radiant heater) and/or generate its own heat via an exothermic reaction. Accordingly, during the hardening process, the layer of wet plaster material is desirably at a temperature in excess of 70 ° C. for at least 20 minutes. If the heat formed by the hardening of the plaster material is insufficient, heat can be applied as described above. For example, the layer of wet plaster material can be at a temperature between 70° C. and 130° C. for a duration of at least 20 minutes.

In some examples, the surface 118 of the layer of polymer material 108 may be processed (e.g., brushed) to have a roughness of at least 5 μm (e.g., within a range of 5-500 μm, 5-100 μm, 5-50 μm, 5-35 μm, or 20-30 μm. For example, the surface 118 may be brushed either before or after the layer of polymer material hardens.

Figure 8:
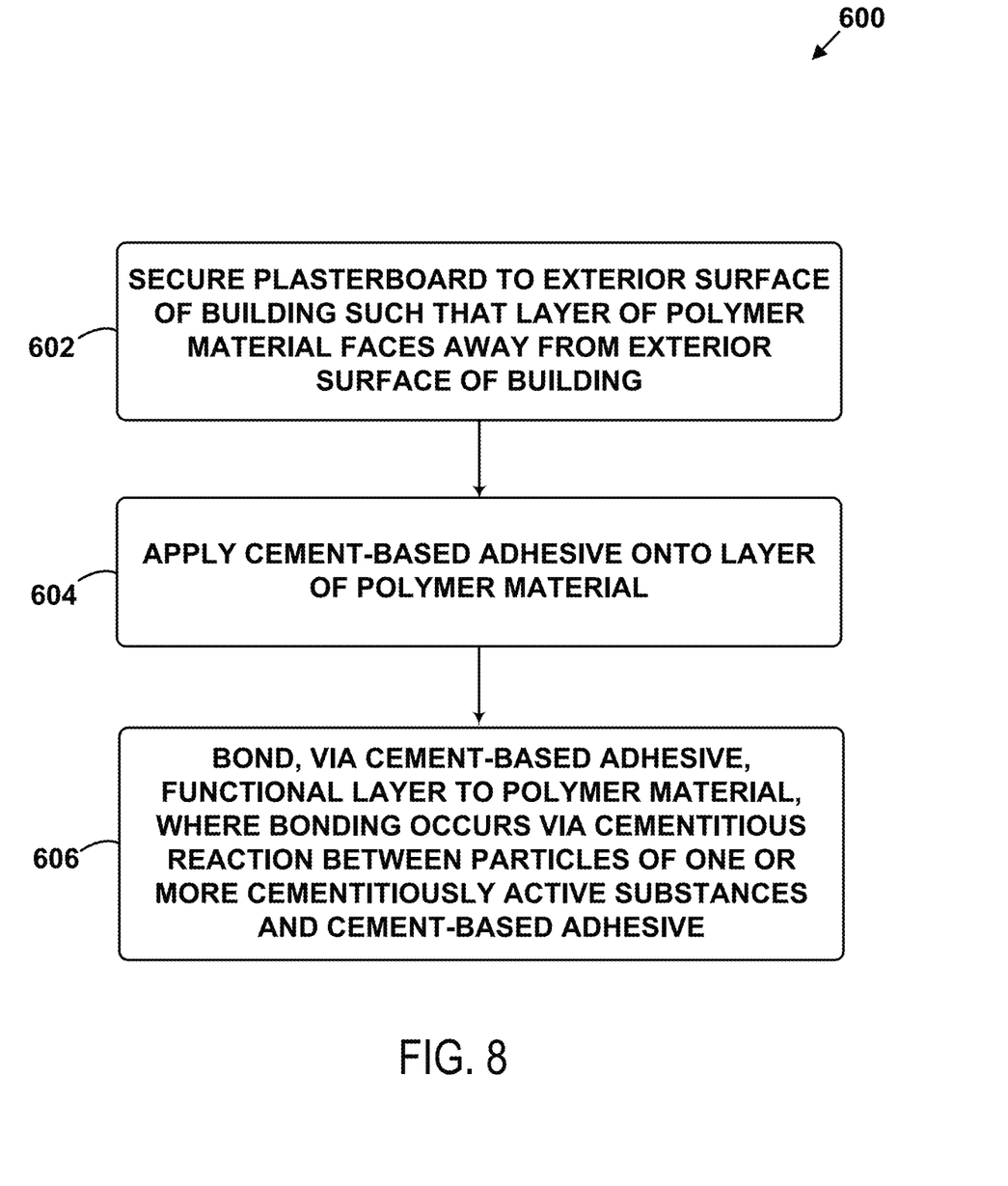
FIG. 8 is a block diagram of a method for installing a plasterboard according to another embodiment of the disclosure.

FIG. 8 is a block diagram of a method 600 of installing a plasterboard. The method 600 may be used to install the plasterboard 100 to the external frame 124 shown in FIG. 4, for example.

At block 602, the method 600 includes securing the plasterboard to an exterior surface of a building such that the layer of polymer material faces away from the exterior surface of the building. Referring to FIG. 4, for example, the plasterboard 100 may be secured (e.g., via nails, screws, other fasteners, or an adhesive) to an exterior surface 127 of the external frame 124 such that the layer of polymer material 108 faces away from the exterior surface 127 of the building. More specifically, the liner 114 may be in contact with (e.g., adhered to) the exterior surface 127 after the plasterboard 100 is secured to the exterior surface 127.

At block 604, the method 600 includes applying a cement-based adhesive onto the layer of polymer material. For example, the cement-based adhesive 122 may be applied onto the layer of polymer material 108 with a trowel, preferably before the plasterboard 100 is secured to the exterior surface 127.

At block 606, the method includes bonding, via the cement-based adhesive, a functional layer to the layer of polymer material. In this context, the bonding occurs via a cementitious reaction between the particles of one or more cementitiously-active substances and the cement-based adhesive. For example, the method 600 may involve bonding, via the cement-based adhesive 122, a functional layer 120 (e.g., a foam-based material or insulation layer) to the layer of polymer material 108. In this context, the bonding occurs via a cementitious reaction between the particles 110 of one or more cementitiously-active substances and the cement-based adhesive 122.

Figure 9:
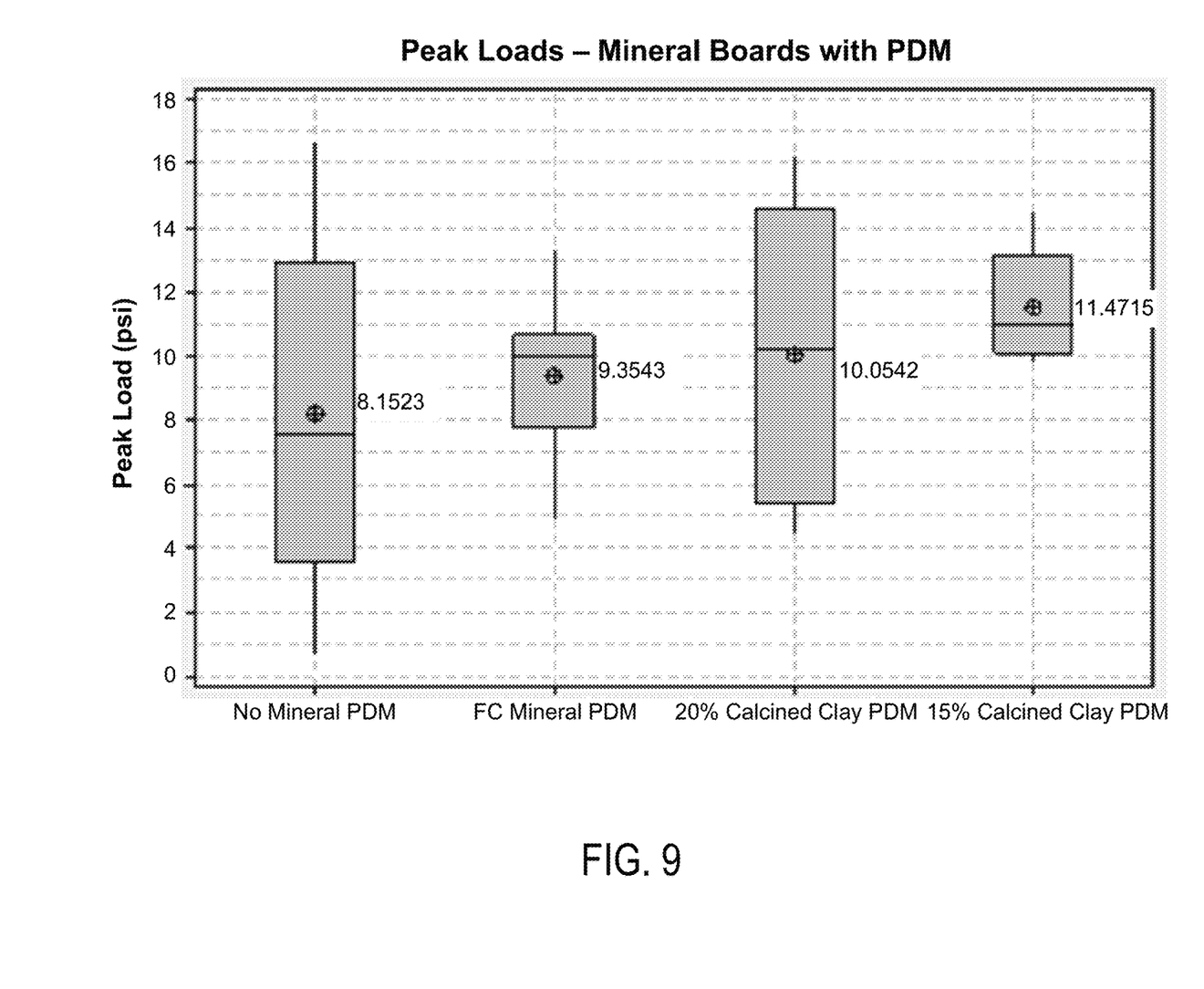
FIG. 9 is a graphical depiction of observed pull strength ranges corresponding to respective compositions of plasterboards.

FIG. 9 is a graphical depiction of observed pull strength (e.g., nail pull strength or "Z-pull") ranges corresponding to respective compositions of layers of polymer material disposed on plasterboards. The experimental results show that plasterboards having a layer of polymer material disposed on their liners that is devoid of cementitiously-active minerals exhibit a lower average pull strength than plasterboards with layers of polymer material that include air-floated clay, 20% calcined clay, or 15% calcined clay. According to the experimental data depicted in FIG. 9, plasterboards without cementitiously-active minerals exhibit an average pull strength of 8.15 pounds per square inch (psi), whereas plasterboards having air floated clay disposed within their layer of polymer material exhibit an average pull strength of 9.35 psi. Plasterboards having a layer of polymer material composed of 20% calcined clay by weight exhibit an average pull strength of 10.05 psi. Plasterboards having a layer of polymer material composed of 15% calcined clay by weight exhibit an average pull strength of 11.47 psi. Dryvit® Primus® cement-based adhesive was used to collect the data depicted in FIG. 9.

Figure 10:
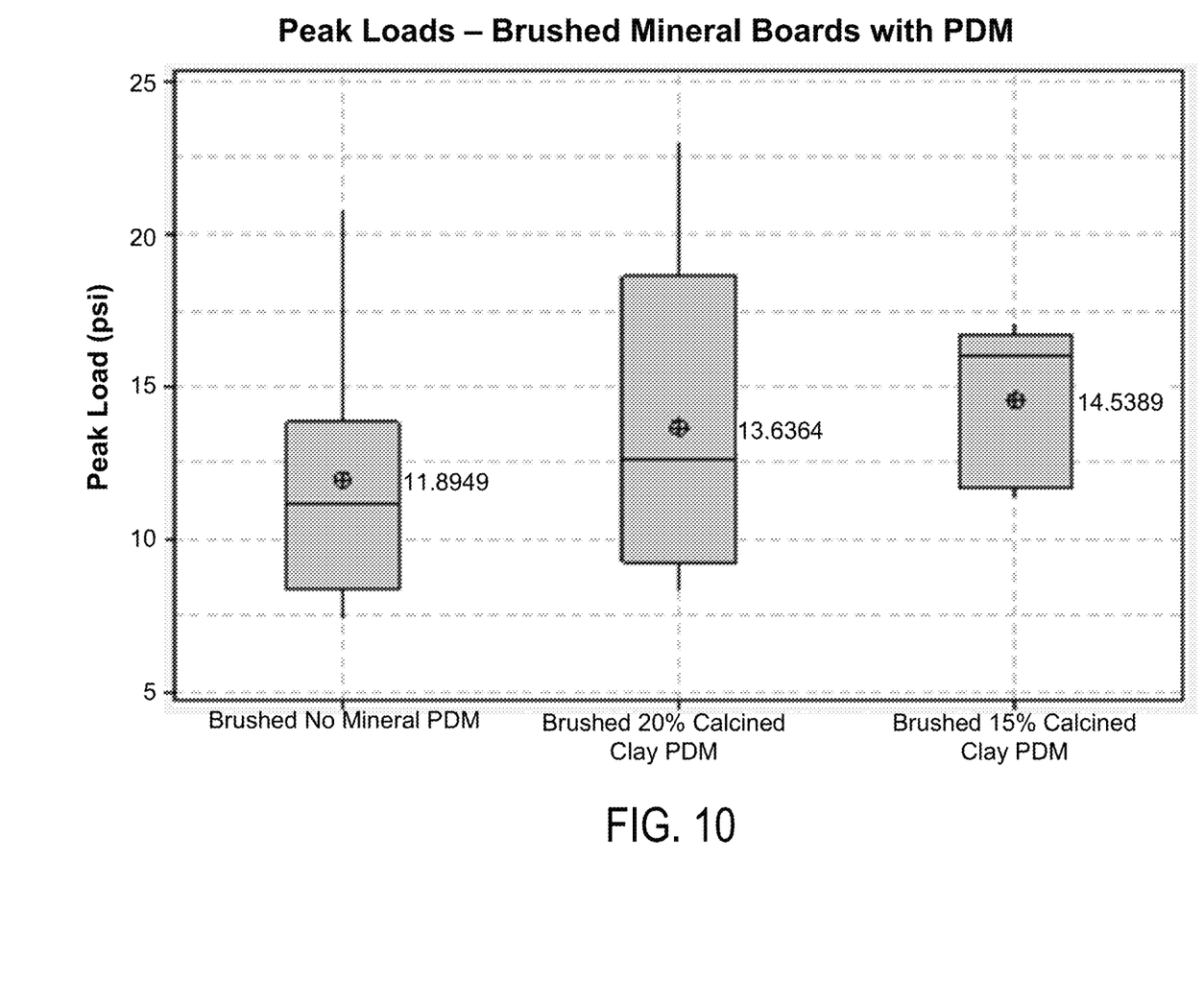
FIG. 10 is a graphical depiction of observed pull strength ranges corresponding to respective compositions of plasterboards.

FIG. 10 is a graphical depiction of observed pull strength (e.g., nail pull strength or "Z-pull") ranges corresponding to respective compositions of layers of brushed or otherwise surface-processed polymer material disposed on plasterboards. Experimental results show that plasterboards having a brushed or processed layer of polymer material disposed on their liners that is devoid of cementitiously-active minerals exhibit a lower average pull strength than plasterboards with brushed or processed layers of polymer material that includes 20% calcined clay or 15% calcined clay. According to the experimental data depicted in FIG. 10, brushed or processed plasterboards without cementitiously-active minerals exhibit an average pull strength of 11.89 psi. Brushed plasterboards having a layer of polymer material composed of 15% calcined clay by weight exhibit an average pull strength of 14.54 psi. Plasterboards having a brushed layer of polymer material composed of 20% calcined clay by weight exhibit an average pull strength of 13.64 psi. Dryvit® Primus® cement-based adhesive was used to collect the data depicted in FIG. 10.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A building assembly comprising
 a plasterboard comprising:
 a layer of hardened plaster material having a first surface and an opposed second surface;
 a layer of polymer material having particles of one or more cementitiously-active substances mixed therein; and
 a liner between the first surface of the layer of hardened plaster material and the layer of polymer material, wherein the layer of polymer material forms an outer surface of the plasterboard; and
 a functional layer of a foam-based material, a wood material or a mineral wool material; and
 a layer of cement-based adhesive having a different composition than the layer of polymer material of the plasterboard and including a first surface disposed in contact with an outer surface of the layer of polymer material of the plasterboard and a second surface opposed to the first surface and bonding the functional layer, wherein the bonding is via a cementitious reaction between the particles of one or more cementitiously-active substances in the polymer layer and the cement-based adhesive.

2. The building assembly of claim 1, wherein the hardened plaster material comprises a gypsum material.

3. The building assembly of claim 1, wherein the layer of polymer material has a thickness within a range of 10 μm to 500 μm.

4. The building assembly of claim 1, wherein the layer of polymer material covers at least 75%, of a surface of the liner that faces away from the first surface of the layer of hardened plaster material.

5. The building assembly of claim 1, wherein the polymer material comprises calcium carbonate, aragonite, mica, glass fibers, glass beads, or any combination thereof.

6. The building assembly of claim 1, wherein the polymer material comprises a thermoplastic material.

7. The building assembly of claim 6, wherein the thermoplastic material comprises ethylene methyl acrylate copolymer, ethylene butyl acrylate copolymer, ethylene vinyl acetate copolymer, polyethylene, thermoplastic polyurethane, a styrene acrylic copolymer, an acrylic copolymer, or any combination thereof.

8. The building assembly of claim 6, wherein the polymeric material comprises a polymer of (meth)acrylamide, hydroxyl alkyl (meth)acrylate, (meth)acrylic acid, N-(alkoxymethyl)-acrylamide, N-(alkylol)-acrylamide, N-(alkyl)-acrylamide, diacetone (meth) acrylamide, acetoacetoxy alkyl(meth)acrylate or any combination thereof.

9. The building assembly of claim 1, wherein a mass ratio of the particles of one or more cementitiously-active substances to the polymer material is in the range of 1-70%.

10. The building assembly of claim 1, wherein the polymer layer includes at least 20% by weight of one or more polymers.

11. The building assembly of claim 1, wherein the one or more cementitiously-active substances comprise one or more of diatomaceous earth, calcined clay, air floated clay, wollastonite, or granulated blast-furnace slag.

12. The building assembly of claim 1, wherein the one or more cementitiously-active substances comprise a cement.

13. The building assembly of claim 1, wherein the one or more cementitiously-active substances comprise one or more polar molecules.

14. The building assembly of claim 1, wherein the one or more cementitiously-active substances are present in the polymer layer in an amount in the range of 5-60% by weight.

15. The building assembly of claim 1, wherein the building assembly forms part of an exterior facade of a building.

16. The building assembly of claim 1, wherein the layer of polymer material has a surface having a roughness of at least 5 µm.

17. The building assembly of claim 1, wherein the liner is a paper liner.

18. The building assembly of claim 1, wherein the cement-based adhesive comprises one or more of belite, alite, tricalcium aluminate, or brownmillerite.

19. A method of installing the building assembly of claim 1, the method comprising:
- securing the plasterboard to an exterior surface of a building such that the layer of polymer material faces away from the exterior surface of the building;
- applying the cement-based adhesive onto the layer of polymer material; and
- bonding, via the cement-based adhesive, the functional layer to the layer of polymer material, wherein the bonding occurs via a cementitious reaction between the particles of one or more cementitiously-active substances and the cement-based adhesive.

* * * * *